US010810218B2

(12) United States Patent
Ng et al.

(10) Patent No.: US 10,810,218 B2
(45) Date of Patent: Oct. 20, 2020

(54) SYSTEM AND METHOD FOR MATCHING OF DATABASE RECORDS BASED ON SIMILARITIES TO SEARCH QUERIES

(75) Inventors: Po Cheung Ng, Roseville (AU); Jeffrey Carson, Oak Lawn, IL (US); Eric Haszlakiewicz, Chicago, IL (US)

(73) Assignee: TransUnion, LLC, Chicago, IL (US)

( * ) Notice: Subject to any disclaimer, the term of this patent is extended or adjusted under 35 U.S.C. 154(b) by 5 days.

(21) Appl. No.: 13/538,926

(22) Filed: Jun. 29, 2012

(65) Prior Publication Data

US 2013/0097157 A1 Apr. 18, 2013

Related U.S. Application Data

(60) Provisional application No. 61/547,544, filed on Oct. 14, 2011.

(51) Int. Cl.
*G06F 16/248* (2019.01)

(52) U.S. Cl.
CPC .................. *G06F 16/248* (2019.01)

(58) Field of Classification Search
CPC .............................. G06F 17/30303
USPC .......................................... 707/723
See application file for complete search history.

(56) References Cited

U.S. PATENT DOCUMENTS

| 5,274,547 | A | * | 12/1993 | Zoffel | G06Q 40/025 705/38 |
| 5,659,731 | A | | 8/1997 | Gustafson | |
| 6,968,348 | B1 | | 11/2005 | Carone et al. | |
| 8,965,923 | B1 | * | 2/2015 | Salcedo | G06F 17/30575 707/610 |
| 2002/0123962 | A1 | * | 9/2002 | Bryman | G06Q 20/04 705/39 |
| 2003/0172025 | A1 | | 9/2003 | Gallina | |
| 2004/0220918 | A1 | * | 11/2004 | Scriffignano et al. | 707/3 |
| 2005/0084152 | A1 | * | 4/2005 | McPeake et al. | 382/173 |
| 2005/0108212 | A1 | * | 5/2005 | Karimisetty | G06F 17/30525 707/3 |
| 2008/0244429 | A1 | * | 10/2008 | Stading | 715/764 |
| 2009/0006075 | A1 | * | 1/2009 | Krishnan et al. | 704/2 |
| 2009/0006230 | A1 | | 1/2009 | Lyda et al. | |
| 2009/0089630 | A1 | * | 4/2009 | Goldenberg et al. | 714/704 |
| 2009/0143984 | A1 | * | 6/2009 | Baudisch | G01C 21/36 701/300 |
| 2010/0153383 | A1 | | 6/2010 | Cohen | |
| 2011/0173197 | A1 | * | 7/2011 | Mehta et al. | 707/737 |
| 2013/0124392 | A1 | * | 5/2013 | Achanta | G06Q 40/00 705/38 |

* cited by examiner

*Primary Examiner* — Dawaune A Conyers
(74) *Attorney, Agent, or Firm* — Neal, Gerber & Eisenberg LLP (57) ABSTRACT

A system and method for the matching of database records based on the similarity between fields in the database records and fields in the search queries is provided. A set of database records may be received from a search engine for further refinement of the search results. The database records may be assigned matching strength points, based on comparisons of fields in the search query and fields in the database records. The records that do not meet predetermined qualifying criteria, based on the matching strength points, may be rejected. The remaining records may be merged together, based on the similarity between fields of the remaining records.

17 Claims, 6 Drawing Sheets

| Match Strength | Points |
|---|---|
| Exact Name Match | 6 |
| Strong Name Match | 4 or 5 |
| Partial Name Match | 2 or 3 |
| No Name Match | 1 or less |
| Exact ID Number Match | 2 |
| Partial ID Number Match | 1 |
| Exact Account Number Match | 2 |
| Partial Account Number Match | 1 |

FIG. 5

| Decision Number | Matched Flag Set | Unmatched Flag Set | Minimum Name Score | Minimum ID/Account # Score |
|---|---|---|---|---|
| 1a | ADDRESS | none | 4 | 0 |
| 1b | ADDRESS | none | 3 | 1 |
| 2 | ADDRESS DOB | none | 3 | 0 |
| 3 | ADDRESS PHONE | none | 3 | 0 |
| 4 | ADDRESS DOB PHONE | none | 2 | 0 |
| 5a | DOB | ADDRESS | 4 | 1 |
| 5b | DOB | ADDRESS | 3 | 2 |
| 6a | PHONE | ADDRESS | 4 | 0 |
| 6b | PHONE | ADDRESS | 3 | 1 |
| 7 | DOB PHONE | ADDRESS | 3 | 0 |
| 8 | none | ADDRESS | 4 | 2 |
| 9 | ADDRESS | DOB | 4 | 0 |
| 11 | ADDRESS PHONE | DOB | 4 | 1 |
| 12a | ADDRESS | PHONE | 4 | 0 |
| 12b | ADDRESS | PHONE | 3 | 1 |
| 13a | none | ADDRESS PHONE | 4 | 2 |
| 13b | none | ADDRESS PHONE | 3 | 3 |
| 14a | none | ADDRESS DOB | 4 | 2 |
| 14b | none | ADDRESS DOB | 3 | 3 |
| 15 | ADDRESS DOB | PHONE | 3 | 0 |
| 16a | PHONE | ADDRESS DOB | 6 | 1 |
| 16b | PHONE | ADDRESS DOB | 5 | 2 |
| 17 | DOB | ADDRESS PHONE | 4 | 2 |
| 18 | ADDRESS | DOB PHONE | 5 | 2 |
| 19a | none | ADDRESS DOB PHONE | 5 | 4 |
| 19b | none | ADDRESS DOB PHONE | 6 | 3 |
| 99 | Exeception | Exeception | Exeception | Exeception |

FIG. 6

SYSTEM AND METHOD FOR MATCHING OF DATABASE RECORDS BASED ON SIMILARITIES TO SEARCH QUERIES

CROSS-REFERENCE TO RELATED APPLICATION

This application claims priority to U.S. Provisional Application No. 61/547,544, filed Oct. 14, 2011, which is incorporated herein by reference in its entirety.

TECHNICAL FIELD

This invention relates to a system and method for matching database records based on search queries. More particularly, the invention provides a system and method for the matching of database records based on the similarity between fields in the records and fields in the search queries.

BACKGROUND OF THE INVENTION

The consumer lending industry bases its decisions to grant credit or make loans, or to give consumers preferred credit or loan terms, on the general principle of risk, i.e., risk of foreclosure. Credit and lending institutions typically avoid granting credit or loans to high risk consumers, or may grant credit or loans to such consumers at higher interest rates or on other terms less favorable than those typically granted to consumers with low risk. Consumer data, including consumer credit information, is collected and used by credit bureaus, financial institutions, and other entities for assessing creditworthiness and aspects of a consumer's financial and credit history.

In many emerging and developing markets, the available consumer data may be of a lower quality as compared to consumer data available in developed markets. For example, records of consumer data may not include a unique identification number, formats of addresses may vary, dates of births may be unreliable or non-existent, name conventions may vary, and particular names and surnames may be very popular and duplicated among a large number of people. Traditional consumer data search algorithms that are often used in developed markets do not always perform well on consumer data in emerging markets. Such traditional algorithms rely on consistent formatting of consumer data, more complete information, and information that is in discrete fields, such as house number, street name, telephone, postal code, and identification number. In developed markets, searches on consumer data may be performed relatively quickly by using a well-indexed relational database key that uses a single field, e.g., identification number or telephone, or a composite key, e.g., date of birth and name, name and house number, etc.

However, search times and the number of results returned using traditional algorithms on a consumer data database in an emerging market may be unacceptable, particularly as the number of records in the database increases. In particular, when a search query to retrieve the record of a particular consumer is run against such a database, a large number of search results may be returned. The search results may include duplicated names, dates of births, addresses, etc. The usefulness of the search results may be diminished due to the need to filter through the search results to find the record of the intended particular consumer.

Therefore, there is a need for an improved system and method that can accurately return matching records from a database and accounts for the formatting and quality issues with consumer data that may be present in emerging markets, in order to, among other things, reduce search times and optimize search results.

SUMMARY OF THE INVENTION

The invention is intended to solve the above-noted problems by providing systems and methods for the matching of database records based on the similarity between fields in the records and fields in the search queries. The systems and methods are designed to, among other things: (1) screen a set of retrieved records from a consumer data database based on the names and/or name initials in the records; (2) keep or reject the retrieved records based on the matching strength of the records as compared to a search query; and (3) potentially merge the records based on the similarity between the kept records.

In a particular embodiment, a set of initially retrieved records found by a search engine may be screened based on the names and/or name initials in the records. The records and the original search query may be normalized. Matching strength points may be assigned based on the similarity between fields in the search query and fields in the records. Based on the assigned matching strength points, records may be kept or rejected for further processing. If more than one record is kept, similarity points may be assigned to the remaining records. The remaining records may be ordered by their similarity scores and compared to one another to determine whether the records should be merged together. The records that remain after the process is completed are returned to the application which initiated the search query.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF THE INVENTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Figure 1:
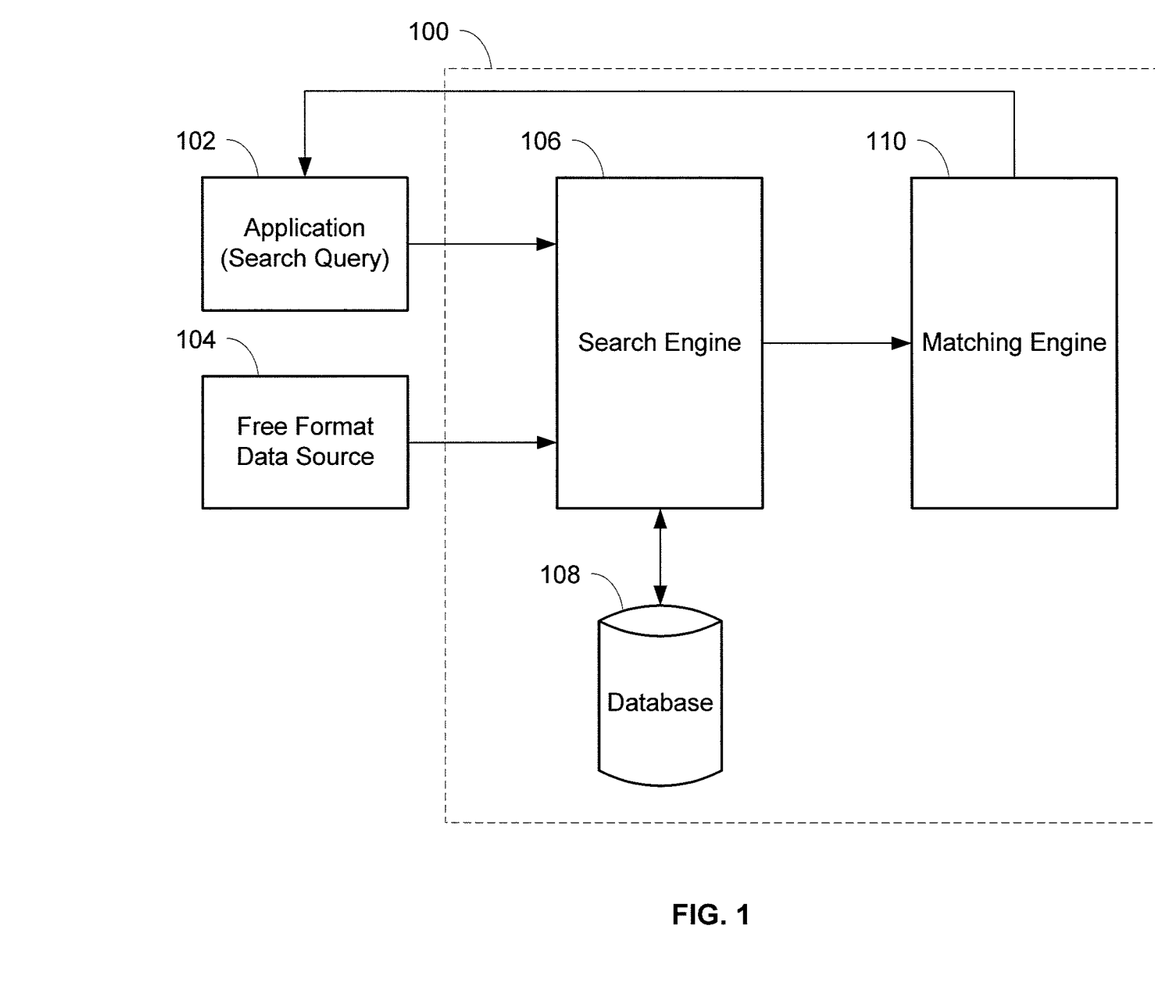
FIG. 1 is a block diagram illustrating a system for the matching of database records based on the similarity between fields in the records and fields in the search queries.

FIG. 1 illustrates a search system 100 for the retrieval and matching of database records based on the similarity between fields in the database records and fields in the search queries, in accordance with one or more principles of the invention. The system 100 may utilize information derived from a free format data source 104 loaded into the system 100 and information from a search query transmitted to the system 100 to return a set of records as a search result set. The system 100 may be part of a larger system, such as the International Credit Reporting System (iCRS) from TransUnion.

Figure 2:
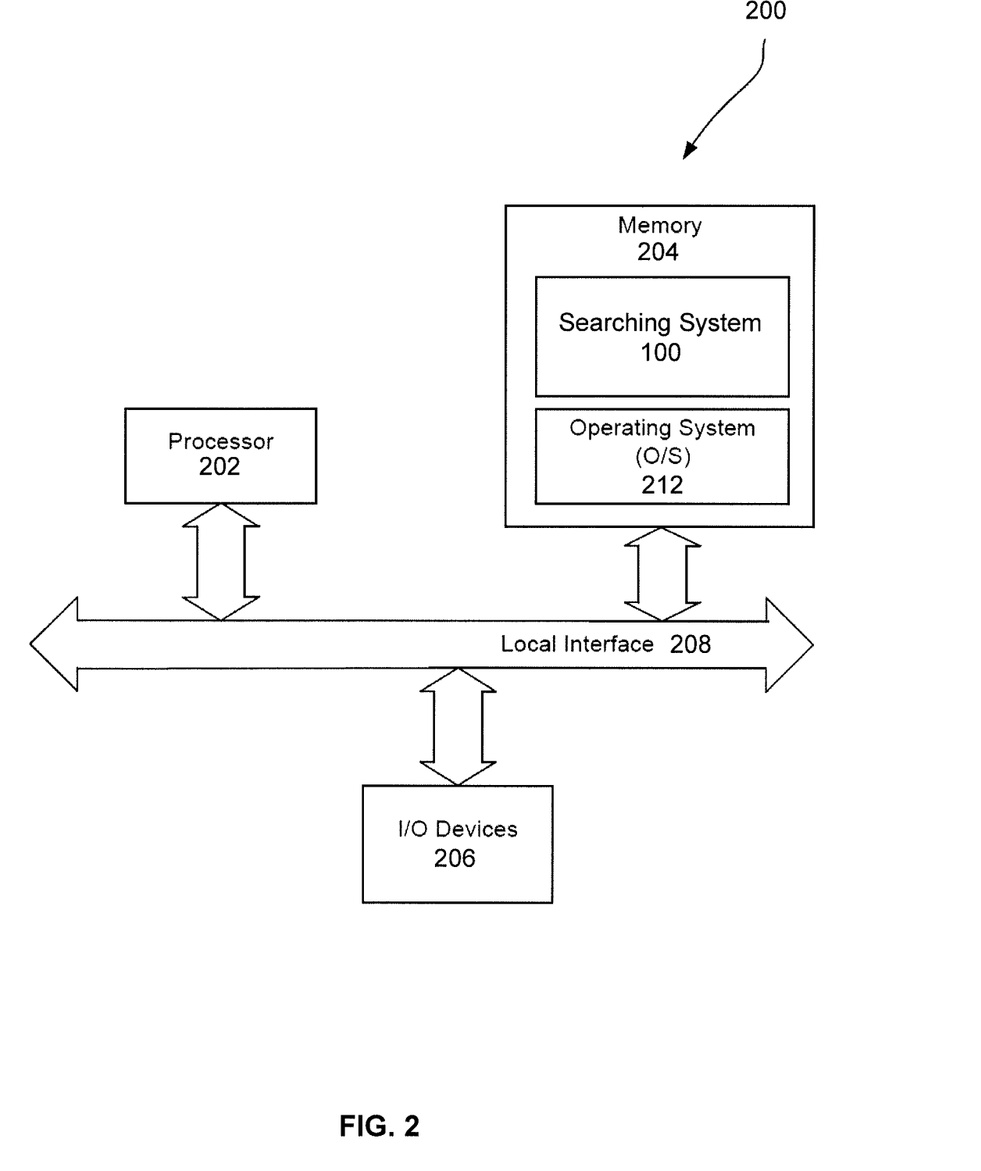
FIG. 2 is a block diagram of one form of a computer or server of FIG. 1, having a memory element with a computer readable medium for implementing the system for the matching of database records based on the similarity between fields in the records and fields in the search queries.

Various components of the system 100 may be implemented using software executable by one or more servers or computers, such as a computing device 200 with a processor 202 and memory 204 as shown in FIG. 2, which is described in more detail below. In one embodiment, the system 100 can perform refined matching on a set of initially retrieved database records. The set of initially retrieved records may be found by a search engine 106 from a database 108, and a matching engine 110 may further process the initially retrieved records to find a more accurate set of results, based on the initial search query. In another embodiment, the system 100 can merge the initially retrieved records together that correspond to the same consumer. The search engine 106 may return a relatively large number of records but be less computationally expensive than the matching engine 110.

An application 102 may generate and initiate a search query to retrieve one or more results from the database 108 that is derived from the data in the free format data source 104. The search query may be intended to retrieve the record of a particular subject consumer. The application 102 may be a software application, for example, that is executing at a credit bureau and/or at a member of the credit bureau, including financial institutions, insurance companies, utility companies, etc. that wish to retrieve data related to a consumer, such as credit information. For example, a search query may be initiated by a bank when a consumer applies for a loan so that the bank can examine the consumer's credit report to assess the creditworthiness of the consumer. The bank can input the consumer's personal identifying information in the search query in order to retrieve the credit report. The application 102 may transmit a message that contains the search query to the system 100, and in particular, the search engine 106. The message may be in a defined JSON (JavaScript Object Notation) format. Search results from the search engine 106 may be further refined by the matching engine 110. The refined results of the search initiated by the search query may be returned to the application 102 by the matching engine 110.

A free format data source 104 may include raw consumer data that is not consistently formatted and/or is unstructured. Consumer data may include identifying information about a consumer as well as financial-related data, such as the status of debt repayment, on-time payment records, etc. Consumer data in the free format data source 104 may originate from a variety of sources, such as members of credit bureaus, including financial institutions, insurance companies, utility companies, etc. The free format data source 104 may include minimal and/or incomplete identifying information in each record corresponding to a customer. Names and addresses in the free format data source 104 may be arbitrary, vague, and/or non-specific. For example, addresses in the free format data source 104 may include "near the railway station, Guntur", "the red house south of Joggers park", or "over by the water tank 30 steps from the village square". Such addresses may be valid and can receive mail but are non-specific as compared to the address formats used in developed markets. Other data in the free format data source 104 may be duplicative and therefore not unique enough to positively identify a particular consumer by itself. For example, the same account number may be used for loan accounts corresponding to different consumers at different branches of the same bank. In this case, further identifying information must be used to uniquely identify a particular consumer.

Raw data from the free format data source 104 may be processed by the search engine 106 and placed in the database 108. In some embodiments, the raw data may be normalized by the search engine 106 and placed in the database 108. Search queries to the search engine 106 may be used to retrieve an initial set of records from the database 108. In some embodiments, the search queries may be normalized and/or transformed by the search engine 106 prior to being executed. Normalization of the raw data and search queries into a condensed normalized format may allow for fuzzier matching of data. A portion or all of the raw data and search queries, such as names, addresses, dates of birth, etc., may be normalized. Normalization can include using exact and pattern substitutions using regular expressions to standardize the data so that fields in a search query may match the corresponding data in the database 108 since both the fields and the data have been normalized.

Transformation of the search queries can include applying alterations to the search queries to allow the queries to be more expansive and inclusive than as specified in the original search queries. Transformed search queries may be sent with or without the original normalized search queries. Transformation rules may be customized for the particular market related to the free format data source. Embodiments of a search engine 106 are disclosed in a concurrently-filed commonly-assigned non-provisional application, titled "System and Method for Subject Identification From Free Format Data Sources" (U.S. patent application Ser. No. 13/539,053, filed Jun. 29, 2012), which is hereby incorporated by reference in its entirety. Search engines utilizing any type of searching algorithm may also be implemented in the search engine 106.

The matching engine 110 may process the search query and the initial set of records retrieved by the search engine 106 from the database 108. A refined set of search results that more accurately match the search query may be returned to the application 102 by the matching engine 110. The matching engine 110 may screen the initial set of records by examining the names and/or name initials in the records. The search query and the records may be normalized by the matching engine 110, prior to assigning matching strength points to each of the records with respect to the search query. Normalization of the search query and the records may be performed in the same, similar, or different manner as the normalization of the raw data and the search queries described above with respect to the search engine 106.

In particular, fields of the search query may be compared to fields in the records to determine the degree to which they match. Using the assigned matching strength points, the matching engine 110 may keep or reject records based on a set of predetermined criteria. If only one record remains, that record may be returned to the application 102 as the record that has the most likelihood of matching the search query for the subject consumer. If more than one record remains, the matching engine 110 may determine the degree of similarity between the remaining records. None, some, or all of the remaining records may be merged together if the records are similar enough. The merged record(s) may then be returned to the application 102 as the record(s) that have the most likelihood of matching the search query for the subject consumer. Records returned to the application 102 by the matching engine 110 have a statistically significant probability of belonging to the subject consumer in question.

FIG. 2 is a block diagram of a computing device 200 housing executable software used to facilitate the searching system 100. One or more instances of the computing device 200 may be utilized to implement any, some, or all of the components in the system 100, including the search engine 106 and the matching engine 110. Computing device 200 includes a memory element 204. Memory element 204 may include a computer readable medium for implementing the system 100, and for implementing particular system transactions. Memory element 204 may also be utilized to implement the database 108. Computing device 200 also contains executable software, some of which may or may not be unique to the system 100.

In some embodiments, the system 100 is implemented in software, as an executable program, and is executed by one or more special or general purpose digital computer(s), such as a mainframe computer, a personal computer (desktop, laptop or otherwise), personal digital assistant, or other handheld computing device. Therefore, computing device 200 may be representative of any computer in which the system 100 resides or partially resides.

Generally, in terms of hardware architecture as shown in FIG. 2, computing device 200 includes a processor 202, a memory 204, and one or more input and/or output (I/O) devices 206 (or peripherals) that are communicatively coupled via a local interface 208. Local interface 208 may be one or more buses or other wired or wireless connections, as is known in the art. Local interface 208 may have additional elements, which are omitted for simplicity, such as controllers, buffers (caches), drivers, transmitters, and receivers to facilitate external communications with other like or dissimilar computing devices. Further, local interface 208 may include address, control, and/or data connections to enable internal communications among the other computer components.

Processor 202 is a hardware device for executing software, particularly software stored in memory 204. Processor 202 can be any custom made or commercially available processor, such as, for example, a Core series or vPro processor made by Intel Corporation, or a Phenom, Athlon or Sempron processor made by Advanced Micro Devices, Inc. In the case where computing device 200 is a server, the processor may be, for example, a Xeon or Itanium processor from Intel, or an Opteron-series processor from Advanced Micro Devices, Inc. Processor 202 may also represent multiple parallel or distributed processors working in unison.

Memory 204 can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic, magnetic, optical, and/or other types of storage media. Memory 204 can have a distributed architecture where various components are situated remote from one another, but are still accessed by processor 202. These other components may reside on devices located elsewhere on a network or in a cloud arrangement.

The software in memory 204 may include one or more separate programs. The separate programs comprise ordered listings of executable instructions for implementing logical functions. In the example of FIG. 2, the software in memory 204 may include the system 100 in accordance with the invention, and a suitable operating system (O/S) 212. Examples of suitable commercially available operating systems 212 are Windows operating systems available from Microsoft Corporation, Mac OS X available from Apple Computer, Inc., a Unix operating system from AT&T, or a Unix-derivative such as BSD or Linux. The operating system O/S 212 will depend on the type of computing device 200. For example, if the computing device 200 is a PDA or handheld computer, the operating system 212 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 212 essentially controls the execution of other computer programs, such as the system 100, and provides scheduling, input-output control, file and data management, memory management, and communication control and related services.

If computing device 200 is an IBM PC compatible computer or the like, the software in memory 204 may further include a basic input output system (BIOS). The BIOS is a set of essential software routines that initialize and test hardware at startup, start operating system 212, and support the transfer of data among the hardware devices. The BIOS is stored in ROM so that the BIOS can be executed when computing device 200 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C #, Pascal, Basic, Fortran, Cobol, Perl, Java, Ada, and Lua. Components of the system 100 may also be written in a proprietary language developed to interact with these known languages.

I/O device 206 may include input devices such as a keyboard, a mouse, a scanner, a microphone, a touch screen, a bar code reader, or an infra-red reader. It may also include output devices such as a printer, a video display, an audio speaker or headphone port or a projector. I/O device 206 may also comprise devices that communicate with inputs or outputs, such as a short-range transceiver (RFID, Bluetooth, etc.), a telephonic interface, a cellular communication port, a router, or other types of network communication equipment. I/O device 206 may be internal to computing device 200, or may be external and connected wirelessly or via connection cable, such as through a universal serial bus port.

When computing device 200 is in operation, processor 202 is configured to execute software stored within memory 204, to communicate data to and from memory 204, and to generally control operations of computing device 200 pursuant to the software. The system 100 and operating system 212, in whole or in part, may be read by processor 202, buffered within processor 202, and then executed.

In the context of this document, a "computer-readable medium" may be any means that can store, communicate, propagate, or transport data objects for use by or in connection with the system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system 100 can be embodied in any type of computer-readable medium for use by or in connection with an instruction execution system or apparatus, such as a computer.

For purposes of connecting to other computing devices, computing device 200 is equipped with network communication equipment and circuitry. In a preferred embodiment, the network communication equipment includes a network card such as an Ethernet card, or a wireless connection card. In a preferred network environment, each of the plurality of computing devices 200 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 200 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Figure 3:
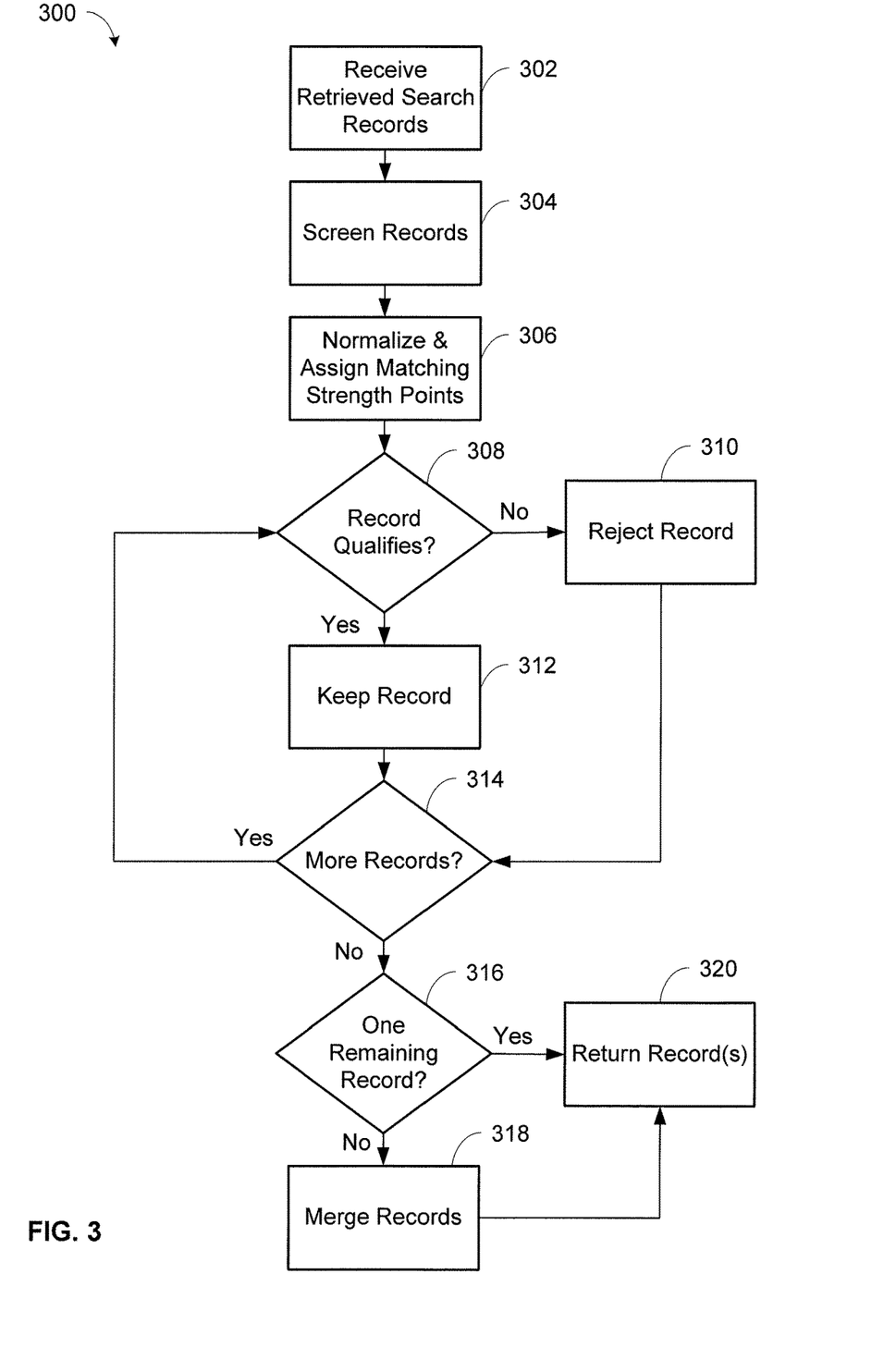
FIG. 3 is a flowchart illustrating operations for screening and matching database records based on the similarity between fields in the records and fields in the search queries using the system of FIG. 1.

An embodiment of a process 300 for the matching of database records based on the similarity between fields in the records and fields in the search queries is shown in FIG. 3. The process 300 can result in the refinement of a set of search results from a search engine 106, and the return of the refined set of results to an application 102 that initiated a search query. The search results may initially be retrieved from a database 108 that includes data derived from a free format data source 104. Other types of data sources, such as data sources with more structured and/or consistent data, may also be sources of the data in the database 108. A free format data source 104 may include raw consumer data that is not consistently formatted or structured. The free format data source 104 may include minimal information for each record corresponding to a customer. Names and addresses in the free format data source 104 may be arbitrary, vague, and/or non-specific. The matching engine 110 may perform all or part of the process 300.

At step 302, a set of retrieved search records may be received at the matching engine 110 from the search engine 106. The records may have been retrieved from the database 108 by the search engine 106 based on a search query received from the application 102. The search engine 106 may utilize any type of searching algorithm to retrieve the records from the database 108. The records may contain consumer data for one or more consumers, such as indicative information (e.g., name, address, date of birth, identification number, etc.), credit information, credit history, and/or other information. Accordingly, the search engine 106 may find records in the database 108 by using search keys such as identification number, account number, date of birth, and/or telephone number.

The received records may be screened at step 304 based on the names and/or name initials that are present in the records. The records may also be screened based on other fields at step 304, in some embodiments. In particular, the name and/or the initials of the name specified in the search query may be compared to the names and/or the initials of the names in the retrieved records. If the names and/or name initials in the search query do not match the names and/or name initials in a particular record, then that record may be discarded and removed from further consideration by the process 300. Common variations on the names may be acceptable to pass this screening step, such as "Chris" matching "Christopher" or "Laura" matching "Lauren".

For example, the set of retrieved records may include the names "James Smith", "Jim L. Smyth", and "Roger Jones" in response to a search query including the name "James Smith". The initial search performed by the search engine 106 may have retrieved these particular records because the records have the same phone number, address, and/or city that match fields in the search query. However, the record with the name "Roger Jones" may be discarded and removed from further consideration at step 304 because the name and/or name initials of "Roger Jones" do not sufficiently match the name and/or name initials of "James Smith" from the search query. The screening at step 304 may be implemented in certain embodiments, such as if the set of retrieved records from step 302 is excessively large. In these cases, the number of records may be reduced by removing records at step 304 which are clearly not relevant, using the name and name initial screening described above. Computational time for executing the steps later in the process 300 may be saved because the number of records that are processed and analyzed is reduced at step 304.

The search query and the records may be normalized at step 306, based on one or more normalization rules. Normalization of the fields in the search query and the fields in the records may standardize the data for subsequent matching and scoring procedures. The fields in the search query and the fields in the records that are normalized may include name, address, telephone number, identification number, and/or other information. Normalization of the search query and the records may be performed in the same, similar, or different manner as the normalization of the raw data and the search queries described above with respect to the search engine 106. Examples of the normalization rules for names may include concatenation of multiple name fields, setting all text to upper case characters, removing text within brackets or parentheses, checking for particular non-allowed characters (e.g., digits), expanding abbreviations, converting particular characters to spaces, detecting gender based on predetermined lookup tables, removing predetermined unwanted noise words, removing single characters, and removing multiple spaces. For example, the entered name "SUB MAJ SIDDARTH MALHOTRA" may have the noise words "SUB" and "MAJ" removed, so that the normalized name becomes "SIDDARTH MALHOTRA". As another example, the entered name "MOH'D SINGH" may have the abbreviation "MOH'D" expanded so that the normalized name becomes "MOHAMMED SINGH". As a further example, the entered name "A B MAJOR HUNTER" may have the noise word "MAJOR" removed and the single-character words "A" and "B" removed, so that the normalized name becomes "HUNTER".

Normalization of addresses may be performed due to the use of obsolete and/or abbreviated street, city, and town names (e.g., "Bombay" or "Born" instead of "Mumbai"), and variations and misspellings in such names. Lookup tables may be utilized when normalizing addresses for quick decoding and normalization. Examples of normalization rules for addresses include setting all text to upper case characters; validating state codes, postal codes, and postal index numbers (PIN); extracting a supplementary PIN; concatenating address fields into a single string; expanding abbreviations; correcting obsolete or improper spellings; checking for non-allowed foreign addresses; and removing certain words and/or noise words (e.g., "CARE OF"). For example, the entered PIN of "560 079" may be compacted so that the normalized PIN becomes "560079". As another example, the entered address "1ST MAIN ROAD" may have the numeric term "1ST" modified so that the normalized address becomes "FIRST MAIN ROAD". As a further example, the address "INDIAN RD N BOM" may have the abbreviations "RD" and "N" expanded and the obsolete city name "BOM" changed so that the normalized address becomes "INDIAN ROAD NORTH MUMBAI". In another example, the address "CARE OF A P KUMAR 13 W MANIKKAM ST" may have its noise words "CARE OF" and associated words "A P KUMAR" removed, and the abbreviations "W" and "ST" expanded so that the normalized address become "13 WEST MANIKKAM STREET".

A matching strength score and/or flags may also be assigned to the records at step 306, based on a comparison of the fields in the records to the fields in the search query. The fields in the records and the fields in the search query may include indicative information, such as name, identification number, account number, telephone number, address, and date of birth. Identification numbers may include an income tax ID number (e.g., Permanent Account Number (PAN)), passport number, voter ID number, driver's license number, ration card number, universal ID number (e.g., Aadhaar), social security number, or other identifying number. The matching strength score may include matching strength points for names, identification numbers, and account numbers that are assigned as specified in the table shown in FIG. 5, for example. It should be noted that the values of the matching strength points shown in FIG. 5 and described below are merely exemplary and any appropriate values may be used. The strength of the matching may be categorized as exact, strong, partial, or none, depending on certain predetermined criteria. Matching flags may be assigned for whether addresses, dates of birth, and telephone numbers exactly match or strongly match. More or less levels of matching strength categorization may be utilized. In some embodiments, e-mail addresses may also be compared to determine if there is an exact match. The rules regarding matching of the indicative information are described further below.

Figure 5:
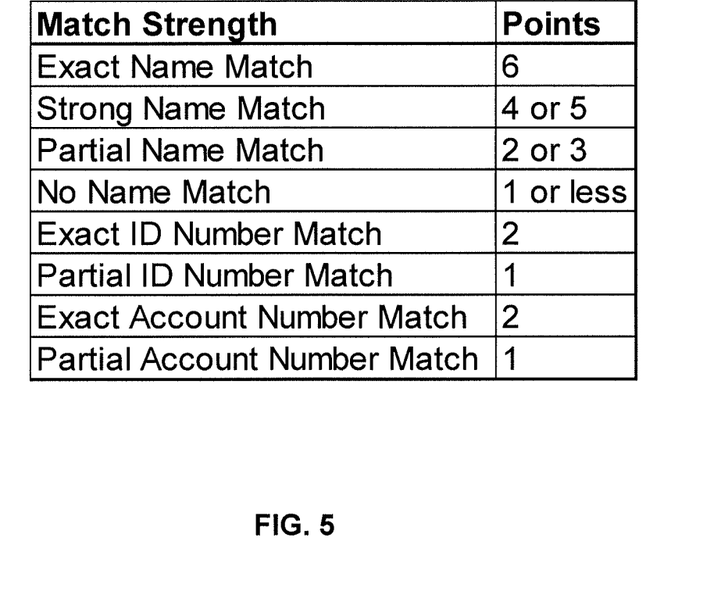
FIG. 5 is a table of exemplary matching strength point assignments for matching of fields between search queries and records.

Names and parts of names in a search query and a record may be compared to determine their level of matching. Normalized versions of the names may be used for matching. Phonetic algorithms, such as Soundex or Phonex, may be utilized to determine exact, strong, or partial matching of all or parts of names. As shown in FIG. 5, six points may be assigned to a record when there is an exact name match between the search query and the record. If there is not an exact name match, other rules may be applied to assign points to the level of matching between names. A base name may be determined by selecting the name with the fewest number of sub-fields (e.g., parts of names), or by selecting the name from the search query if the number of sub-fields in the search query and the record is the same. Words and initials in the base name may be compared to words and initials in the other name to determine whether there is an exact match, headstring match, or partial match. More or less levels of matching strength categorization may be utilized. If there is not at least one exact match or partial match for any of the words and/or initials, then no points are assigned to the record and it may be considered a no name match. Points may be assigned based on exact, headstring, partial, or initial matches of sub-fields of names. Points may also be subtracted based on if there are no full name matches at all. Certain predetermined popular names may be ignored in some embodiments.

For example, if the name in the search query is "A KUMAR" and the name in the record is "A KISHORE KUMAR", then there may be a strong match of five points because the two sub-fields "A" and "KUMAR" are exact matches. As another example, if the name in the search query is "A BABU SALAM" and the name in the record is "AGIT B C SALAM", then there may be a strong match of four points because the sub-field "SALAM" is an exact match and the initials "A" and "B" are partial matches. As a further example, if the name in the search query is "A BABU SALAM" and the name in the record is "AGIT B SALAM SINGH", then there may be a partial match of two points because only some of the initials are a partial match.

Identification numbers in a search query and a record may be compared to determine their level of matching. Points may be assigned to a record when there is an exact or strong match of an identification number. More or less levels of matching strength categorization may be utilized. An exact match of identification numbers may be assigned two points, as shown in FIG. 5. In one embodiment, only alphanumeric characters may be considered when matching identification numbers. A base identification number may be determined by selecting the identification number that has the least number of alphanumeric characters. A mismatch may be counted when a pair of consecutive characters is swapped between a base identification number and the other identification number. A strong match (e.g., one point assigned for a "partial ID number match" as shown in FIG. 5) may occur when there is one mismatch and the base identification number has less than a predetermined number of alphanumeric characters, e.g., eight alphanumeric characters, or when there are no more than two mismatches and the base identification number has more than a predetermined number of alphanumeric characters, e.g., seven alphanumeric characters. For example, if the identification number in the search query is "A 9388067" and the identification number in the record is "A-9388067", then there may be an exact match (ignoring the "-") with two points assigned. As another example, if the identification number in the search query is "MT/08/039/0060725" and the identification number in the record is "MR/08/039/0060725", then there may be a strong match with one point assigned because there is only one mismatch ("T" and "R").

If an account number in a search query and a record exactly match, then two points may be assigned as shown in FIG. 5. Normalized versions of account numbers may be utilized when performing matching. In the case where a particular record has multiple account numbers, the best matching status of all of the account numbers may be returned. Leading zeroes and non-alphanumeric characters may be stripped from the account numbers in the search query and the record for purposes of matching. A base account number may be determined by selecting the account number with the least number of alphanumeric characters. A mismatch may be counted when a pair of consecutive characters is swapped between a base account number and the other account number. If there is one mismatch, then a partial match of account numbers may be assigned with one point, as shown in FIG. 5.

If an address in a search query and a record exactly match, then the matching ADDRESS flag may be assigned. Normalized versions of the address in the search query and/or the record may be used to determine whether addresses match. When normalized versions are used, the matching ADDRESS flag may be assigned if there is an exact or strong match. More or less levels of matching strength categorization may be utilized. A strong match may occur, for example, if greater than a predetermined percentage, e.g., 50%, of the numbers in an address match and other parts of the address (e.g., state code, PIN) exactly match. As an example, the normalized address in the search query may be "UNIT 71, 73 BOTAWALA BUILDING, MUMBAI" and the normalized address in the record being examined may be "71/73 BOTAWALA BLDG, MUMBAI, 400023". The addresses can be considered a strong match and the matching ADDRESS flag may be assigned to this record. This is due to the matching of the numbers in the address and the remainder of the address.

If a date of birth in a search query and a record exactly match, then the matching DOB flag may be assigned. Strong and partial matching of dates of birth may also result in the assignment of the matching DOB flag in certain circumstances. For example, a strong match of the date of birth may include when the year is the same in the search query and the record, but the month and day are swapped. If the two dates differ by less than a predetermined time period, e.g., 90 days, regardless of the values in the variables, then there may be a strong match. A strong match may further occur if the month and day are the same, but the last two digits of the year are swapped. More or less levels of matching strength categorization may be utilized.

Calculations may also be performed on the date of birth to determine the level of matching. For example, if the last two digits of the year in the search query and the record are swapped, then a swapped_YY_cnt variable may be set to 1. As another example, if the last two digits of the day in the search query and the record are swapped, then a swapped_DD_cnt variable may be set to 1. As a further example, the number of typographical differences in the day, month, and/or year may be set in a typo_cnt variable. Typographical differences may be due to errors in transcribing handwritten records to electronic records, such as between the digits 1 and 7, 6 and 5, and 8 and 3. As another example, the number of mismatched digits in the day, month, and/or year may be set in a mismatched_cnt variable. The sum of these variables may be placed in a total_cnt variable. A strong match for the date of birth may then include if the total_cnt variable is equal to 1. If the total_cnt variable is equal to 2, and the swapped_YY_cnt variable added to the swapped_DD_cnt variable is equal to 0, then there may be a strong match if the two dates differ by less than a predetermined time period, e.g., 90 days. Partial matches between the date of birth in the search query and the record may also occur.

For example, if the date of birth in the search query is "Jun. 9, 1965" and the date of birth in the record is "Sep. 6, 1965", this may be a strong match because the month and day are swapped, and the matched DOB flag may be assigned. As another example, if the date of birth in the search query is "Jun. 9, 1965" and the date of birth in the record is "Jun. 8, 1965", this may be a strong match because there is one mismatched digit, and the matched DOB flag may be assigned. As a further example, if the date of the birth in the search query is "Jun. 19, 1965" and the date of birth in the record is "Sep. 1, 1965", this may be a strong match because the dates differ by less than a predetermined time period, e.g., 90 days, and the matched DOB flag may be assigned. Both strong and partial date of birth matches may cause the matched DOB flag to be assigned.

If a telephone number in a search query and a record exactly match, then the matching PHONE flag may be assigned. The type of phone numbers (e.g., local/landline and mobile) may also be specified in the search query and record. In some embodiments, matching may only be performed between local/landlines numbers or between mobile numbers, but not between local/landline numbers and mobile numbers. Strong matches may also result in the assignment of the matching PHONE flag. A base telephone number may be determined by selecting the telephone number in the search query or the record that has the least number of digits. Each digit may be compared individually from right to left, or in some embodiments, from left to right. If one pair of digits is swapped or if there is one non-matching digit, then the telephone numbers can be considered a strong match and the matching PHONE flag may be assigned. More or less levels of matching strength categorization may be utilized.

For example, if the telephone number in the search query is "6398834" and the telephone number in the record is "011-6398834", then there may be an exact match because the search query telephone number is the base and the digits match when compared from right to left. As another example, if the telephone number in the search query is "0091-22-56384600" and the telephone number in the record is "2384600", then there may be a strong match because the record telephone number is the base and only the first digit (2) is different from the first digit (6) of the search query telephone number, when compared from right to left. As a further example, if the telephone number in the search query is "91-9871123141" and the telephone number in the record is "98711 23411", then there may be a strong match because there is a swap of one pair of digits, e.g., the second to last and third to last digits (1 and 4), when compared from right to left.

Figure 6:
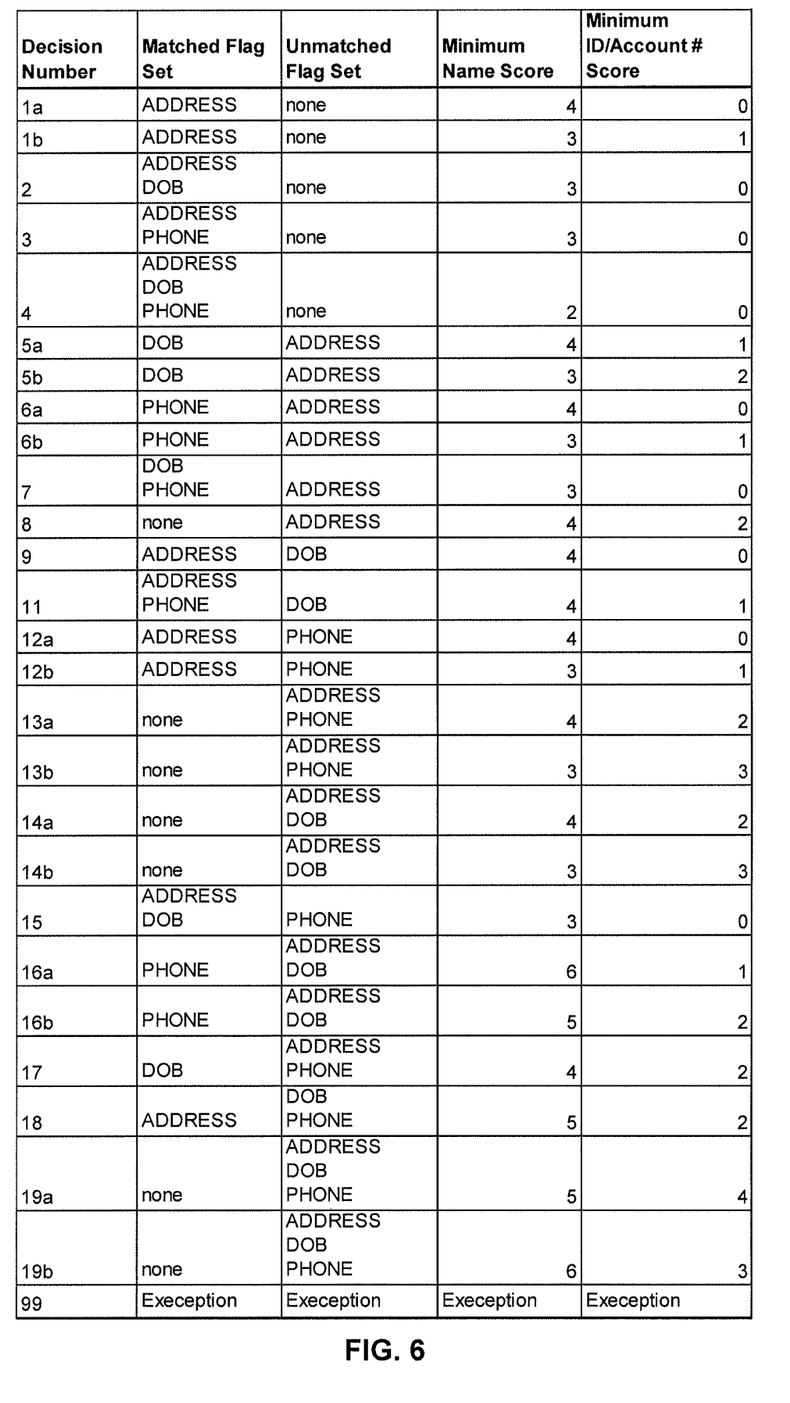
FIG. 6 is a table of exemplary qualifying criteria for matching of search queries and records.

Once the appropriate matching strength points and flags have been assigned at step 306, as described above, then it can be determined whether a record qualifies for further consideration at step 308. If a particular record meets any one of the qualifying criteria, such as the exemplary qualifying criteria shown in FIG. 6, then the record may be kept at step 312 for further consideration. Other qualifying criteria may also be utilized. For example, the qualifying criteria may include when an address and a date of birth match, then the name matching score can be slightly weaker without a matching of the identification number or account number. As another example, the qualifying criteria may include when only the address matches, the name matching score can be slightly weaker, and the identification number or account number may have a partial match. In some embodiments, there may be an exception (shown as decision number 99 in FIG. 6) for records that are found with an exact identification number match or an exact account number match with a minimum number of alphanumeric characters, e.g., 14 alphanumeric characters. However, if a particular record does not meet any one of the qualifying criteria, then that record may be rejected at step 310 from further consideration. If there are more records to be considered at step 314, then the process 300 returns to step 308 to determine if the next record meets the qualifying criteria. If there are no more records to be considered at step 314, then the process 300 continues to step 316.

At step 316, it is determined if there is only one remaining record following the qualifying of the records at steps 308, 310, 312, and 314. If there is only one remaining record at this point, then that record may be returned to the application 102 as the result at step 320, and the process 300 is complete. However, if there is more than one remaining record at step 316, then the process 300 continues to step 318 where the remaining records may be merged together if they are similar enough to one another. When records are merged together, the corresponding records may also be updated to be merged together in the database 108 and/or in other databases.

Figure 4:
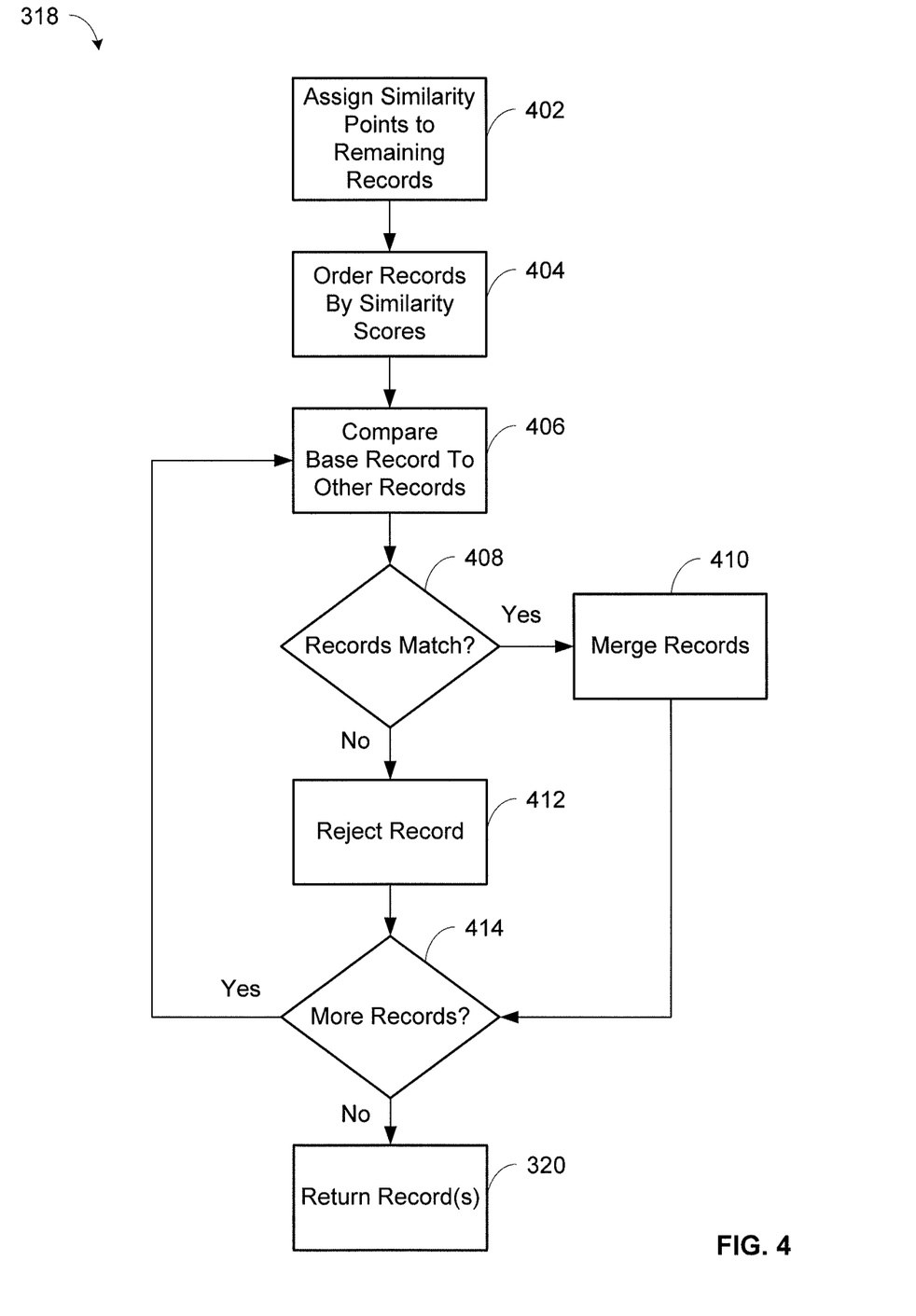
FIG. 4 is a flowchart illustrating operations for merging database records based on the similarity between fields in the records and fields in the search queries using the system of FIG. 1.

An embodiment of step 318 for merging records is now described with reference to FIG. 4. At step 402, a similarity score including similarity points may be assigned to each of the remaining records based on the degree of similarity between fields in the search query and fields in each of the records. The assignment of similarity points may be the same, similar, or vary from the assignment of matching strength points described above. The similarity points may be used to order the records, as described below with respect to step 404, and may also be used as described below with respect to step 406 when comparing records together to determine if the records should be merged. Similarity points may be assigned based on names, addresses, identification numbers, account numbers, telephone numbers, dates of birth, gender, and other information. A total number of similarity points may be assigned to a particular record after comparing this information between the search query and the records. The scoring of similarity points is based against the search query for purposes of ordering the remaining records. It should be noted that the values of the similarity points described below are merely exemplary and any appropriate values may be used.

Duplicate words in names and other extraneous information (e.g., "c/o", "w/o") may be removed before assigning similarity points to names. A base name may be determined by selecting the name with the fewest number of sub-fields (e.g., parts of names), or by selecting the name from the search query if the number of sub-fields in the search query and the record is the same. Identically matching initials or name words may be removed from the base name and the other name. If the base name has no remaining sub-fields, eight points may be assigned and the similarity score assignment for names is completed. If there are remaining sub-fields, partially matched name words may then be removed from the base name and the other name. If the base name has no remaining sub-fields at this point, six points may be assigned and the similarity score assignment for names is completed. If there are remaining sub-fields, then two points may be assigned for ambiguous matches (due to remaining name words), otherwise four points may be assigned. Modifications to the similarity score for names may occur if there are unmatched fields found in the base name or the other name. For example, if the base name is "A BABU" and the other name is "A BABU", then the assigned similarity score may be eight because it is an exact match. As another example, if the base name is "A KUMAR" and the other name is "A KISHORE KUMAR", then the assigned similarity score may be seven because there is exact match of two sub-fields ("A" and "KUMAR") for eight points but one point is subtracted due to the remaining unmatched sub-field of "KISHORE" in the other name.

Similarity points may also be assigned based on addresses, identification numbers, account numbers, telephone numbers, and dates of birth in a similar fashion to the assignment of matching strength points described above. In particular, for addresses, six points may be assigned for an exact match and four points may be assigned for a strong match. For identification numbers, eight points may be assigned for an exact match and two points may be assigned for a strong match. Mismatches in the identification numbers may cause four points to be subtracted from the similarity score for a record. When account numbers have an exact match, two points may be assigned. When telephone numbers are matched, two points may be assigned for an exact match and one point for a strong match. For dates of birth, eight points may be assigned for an exact match, four points for a strong match, and zero points for a partial match. Six points may be subtracted from the similarity score when there is no match of a date of birth. If a gender is present in the records, three points may be assigned for an exact match, but six points may be subtracted from the similarity score for a mismatch in gender.

As described above, an exception may occur for records that are found with an exact identification number match or an exact account number match with a minimum number of alphanumeric characters, e.g., 14 alphanumeric characters. An exception score may be assigned at step 402 as part of the similarity score if a record satisfies the exception criteria. In the case where a record has an exact identification number match with at least a minimum number of alphanumeric characters, e.g., 14 alphanumeric characters, then points for the exception score may be assigned, including three points for an exact or partial match on the account number; three or two points for an exact match or strong match on the address, respectively; three points for an exact match of the date of birth; two points for an exact match on the telephone number; and two points for an exact match on the name. One point may also be assigned to the exception score if the matching strength score for the name, as calculated at step 306, is more than five points.

In the case where a record has an exact account number match with at least a minimum number of alphanumeric characters, e.g., 14 alphanumeric characters, then points for the exception score may be assigned, including three points for an exact match of an identification number; three or two points for an exact or strong match on the address, respectively; three points for an exact match of the date of birth; two points for an exact match of the telephone number; and two points for an exact match on the name. One point may also be assigned to the exception score if the matching strength score for the name, as calculated at step 306, is more than five points.

After the exception score is calculated, it may be determined whether the particular record should be kept or rejected from further consideration. If the exception score is four or more, then the record may be kept. If the record has an exact account number match with at least a minimum number of alphanumeric characters, e.g., 14 alphanumeric characters, and the exception score is less than two, then the record may be rejected, otherwise the record may be kept. If the record has a matching strength score for the name of more than two points, then the record may be kept. Any other record with an exception score that does not meet these conditions may be rejected. At this point, any records with less than eight points in the exception score may be rejected from further consideration.

In some embodiments, a special check of the records can be performed when the similarity scores are eight points or more and when the dates of birth are not an exact match or if there is a partial match of the address. If the date of birth of a record differs by more than a predetermined time period, e.g., 90 days, from the date of birth in the search query, and the record has a similarity score of eight points or more, then the record may pass the special check if there is an exact match of the identification number or of the address. If not, then one special check point may be assigned for each of the following conditions: if there is a partial match of the identification number; if there is an exact or partial match of the telephone number; or if there is a strong match of the address. The record in this case may pass the special check if there is at least one special check point and the matching strength score for the name is more than three points, or if there is more than one special check point. Otherwise, the record may be rejected from further consideration.

If there is a partial match of the address of a record with a similarity score of eight points or more, then the record may pass the special check if there is an exact match of the identification number. If not, then special check points may be assigned for each of the following conditions: one special check point if there is a partial match of the identification number; one special check point if there is an exact match of the telephone number; or three points if there is an exact match of the date of birth. The record in this case may pass the special check if there is at least one special check point and the matching strength score for the name is more than three points, or if there is more than one special check point. Otherwise, the record may be rejected from further consideration.

After the assignment of similarity points at step 402, the remaining records may be ordered by their similarity scores at step 404. The record with the best, e.g., the highest, similarity score can be considered the base record. The other remaining records may be compared to the base record at steps 406 and 408 to determine whether merging of records should occur, based on merging criteria. The merging criteria may include comparisons of information in the base record and the remaining records, whether a similarity score of the records meets a predetermined threshold, and/or other criteria, as described below. First, the identification number in the base record, if present, may be compared to the identification numbers in the other records. If the identification numbers in any of the other records do not match the identification number of the base record, then the mismatching record(s) may be rejected at step 412, otherwise the record(s) may be further considered. Next, the name in the base record may be compared to the names in the other records, based on the similarity score for names that were calculated at step 402. The other record(s) may be rejected at step 412 if the similarity score for names do not meet a predetermined threshold, e.g., at least three points, otherwise the record(s) may be further considered. In some embodiments, if there is an exact match of the identification number, than the threshold for the similarity score for names may be one point, for example.

Next, if the date of birth is present in the base record, it may be compared to the dates of birth in the other records. If the dates of birth have at least a strong match at this point, then the other record(s) may be merged with the base record at step 410, otherwise the record(s) may be rejected at step 412. The comparison of the date of birth may be skipped if the other record(s) has a similarity score for names that is at least four points and if there is an exact match of the identification number. The gender in the base record, if present, may also be compared to the other records. Gender may be derived in some embodiments based on the name and/or address, e.g., if "Mr.", "Ms.", "Mrs.", or other identifiers exist. The gender comparison may be skipped if the other records have a similarity score for names of at least six points and at least a strong match of the date of birth. If the genders of the base record and the other record(s) do not match, the other record(s) may be rejected at step 412.

Finally, the address in the base record is compared to the addresses in the other records. The address comparison may only be performed if the other records have a similarity score for names of three points or less, the date of birth is not an exact match, and the identification number is absent or only a partial match, for example. The other record(s) may be rejected at step 412 if there is an ambiguously matching address, e.g., a partial match, or if different numbers were found between the address in the search query and the address in the record. Each of the other records may be compared to the base record through the execution of steps 406, 408, 410, 412, and/or 414.

If the base record and one or more other records are to be merged at step 410, some or all of the fields in the base record or the other records may be updated or changed, depending on certain merge criteria. The fields that may be updated or changed may include name, identification number, telephone number, e-mail address, address, consumer dispute remarks, tradeline, employment, historical fields, and/or other information. Names and addresses may be merged together if there is an exact or strong match of the names of the base record and the other record. Identification numbers, telephone number, and e-mail addresses may be merged together if there is an exact match. Merging of fields may also be dependent on the date a particular record and/or field was last updated or were reported earliest.

An ordered list of records that at least partially match the search query fields may be returned to the application 102 from the matching engine 110 at step 320. The ordered list of records may be a result of at least steps 306, 308, 310, 312, 314, 316, and 318 as described with respect to FIG. 3, as well as at least the steps in the process 318 as described with respect to FIG. 4. The base subject record may be the record that has the best matching strength score and/or the best similarity score, and may have been merged with another record. The other records with the next highest scores may also be returned at step 320 as secondary subject records.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A method of matching data in a search query to data in a database for determining a subject consumer's credit risk, the method comprising:
arranging a search query search engine and a search query matching engine to be in communication with a processor and an Internet accessible database, the database comprising a plurality of unstructured, incomplete and/or inconsistently formatted data about a plurality of consumers from a free form data source, the data being stored in respective database fields in a plurality of database records;
in response to receiving, via the processor, a search query communicated over the Internet to the search engine by a remote application to search for and retrieve credit-related data corresponding to the subject consumer, retrieving via the processor an initial set of search results from the database corresponding to the subject consumer, the step of retrieving being accomplished by converting and standardizing the search query and the plurality of database records via exact and pattern substitutions using regular expressions into a normalized search query and a plurality of normalized database records, based on a normalization rule, wherein the normalized search query comprises a normalized search field and each of the plurality of normalized database records comprises a normalized database field;
refining the initial set of search results to obtain a final plurality of normalized database records corresponding to the subject consumer by determining by the processor a degree to which fields in the search query match the fields in the plurality of database records, the step of refining comprising the steps of
comparing, by the matching engine via the processor, the normalized search field and the normalized database field of each of the plurality of normalized database records, wherein comparing comprises calculating a difference between a date of birth of the normalized search field and a date of birth of the normalized database field of each of the plurality of normalized database records, and
assigning a matching strength metric associated with each of the plurality of normalized database records, based on the calculated difference between the date of birth of the normalized search field and the date of birth of the normalized database field of each of the plurality of normalized database records, using the processor; and
transmitting, by the matching engine via the processor to the application over the Internet, a subset of the normalized plurality of database records, wherein the subset meets qualifying criteria that are based on the matching strength metric.

2. The method of claim 1, further comprising:
screening the plurality of database records using the processor, based on the search field and the database field of each of the plurality of database records; and
discarding a rejected subset of the plurality of database records, using the processor, if the rejected subset does not pass the screening of the plurality of database records.

3. The method of claim 2, wherein:
the search field and the database field of each of the plurality of database records comprise one or more of a name word or name initials;
screening comprises comparing one or more of the name word or the name initials of the search query to one or more of the name word or the name initials of each of the plurality of database records, using the processor; and
discarding comprises rejecting the rejected subset of the plurality of database records if one or more of the name word or the name initials of the search query does not match one or more of the name word or the name initials of each of the plurality of database records.

4. The method of claim 1:
further comprising merging the subset of the plurality of database records to produce a merged subset, using the processor, based on a similarity between each of the subset of the plurality of database records;
wherein transmitting the subset comprises transmitting the merged subset of the plurality of database records from the processor.

5. The method of claim 1, wherein the matching strength metric comprises one or more of a matching strength score or a matching strength flag.

6. The method of claim 1, wherein the normalized search field and the normalized database field of each of the plurality of normalized database records comprise indicative information, the indicative information comprising one or more of a name, an identification number, an account number, a telephone number, an address, a date of birth, a gender, or an e-mail address.

7. The method of claim 1, wherein:
comparing the normalized search field comprises comparing one or more of a name word or name initials of the normalized search field with one or more of a name word or name initials of the normalized database field of each of the plurality of normalized database records, using the processor; and
assigning the matching strength metric comprises assigning a matching strength score associated with each of the plurality of database records, using the processor, based on comparing one or more of the name word or the name initials of the normalized search field with one or more of the name word or the name initials of the normalized database field of each of the plurality of normalized database records.

8. The method of claim 7, wherein comparing the normalized search field comprises utilizing a phonetic algorithm to match one or more of the name word or the name initials of the normalized search field with one or more of the name word or the name initials of the normalized database field of each of the plurality of normalized database records, using the processor.

9. The method of claim 1, wherein:
comparing the normalized search field comprises comparing an address of the normalized search field with an address of the normalized database field of each of the plurality of normalized database records, using the processor; and
assigning the matching strength metric comprises assigning a matching strength flag associated with each of the plurality of database records, using the processor, based on comparing the address of the normalized search field with the address of the normalized database field of each of the plurality of normalized database records.

10. The method of claim 1, wherein:
assigning the matching strength metric comprises assigning a matching strength flag associated with each of the plurality of database records, using the processor, based on the calculation involving the date of birth of the normalized search field and the date of birth of the normalized database field of each of the plurality of normalized database records.

11. The method of claim 1, wherein the qualifying criteria comprises a predetermined condition of the matching strength metric, the method further comprising creating the subset of the plurality of database records with one or more of the plurality of database records, if the matching strength metric associated with the one or more of the plurality of database records satisfies the predetermined condition.

12. The method of claim 11, wherein the predetermined condition of the matching strength metric comprises one or more of a predetermined threshold of a matching strength score and a predetermined status threshold of a matching strength flag.

13. The method of claim 1, wherein the unstructured and incomplete consumer financial data includes debt repayment status and on-time debt repayment metrics about the plurality of consumers.

14. The method of claim 1, wherein the unstructured data includes a description of a residence address of the subject consumer based on relative distance of a landmark from the residence address of the subject consumer.

15. The method of claim 1, wherein converting and standardizing the search query creates a condensed normalized search query.

16. The method of claim 1, wherein converting and standardizing the plurality of database records creates a plurality of condensed normalized database records.

17. The method of claim 1, wherein the normalization rule for a consumer name includes concatenation of multiple name fields into a single string.

* * * * *